United States Patent
Seip et al.

(10) Patent No.: US 10,689,294 B2
(45) Date of Patent: Jun. 23, 2020

(54) PULVERULENT PRIMER COMPOSITION

(71) Applicant: BASF SE, Ludwigshafen am Rhein (DE)

(72) Inventors: Klaus Seip, Mutterstadt (DE); Karsten Kuhne, Hildesheim (DE); Pavlo Ilyin, Traunstein (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/779,932

(22) PCT Filed: Dec. 2, 2016

(86) PCT No.: PCT/EP2016/079605
§ 371 (c)(1),
(2) Date: May 30, 2018

(87) PCT Pub. No.: WO2017/093493
PCT Pub. Date: Jun. 8, 2017

(65) Prior Publication Data
US 2018/0346381 A1    Dec. 6, 2018

(30) Foreign Application Priority Data

Dec. 4, 2015   (EP) .................................. 15197959

(51) Int. Cl.
| | | |
|---|---|---|
| *C04B 28/02* | (2006.01) | |
| *C04B 41/00* | (2006.01) | |
| *C04B 41/65* | (2006.01) | |
| *C09D 5/03* | (2006.01) | |
| *C09D 5/00* | (2006.01) | |
| *C04B 41/50* | (2006.01) | |
| *C09D 133/14* | (2006.01) | |
| *C04B 28/06* | (2006.01) | |
| *C04B 28/08* | (2006.01) | |
| *C04B 28/04* | (2006.01) | |
| *C04B 24/26* | (2006.01) | |
| *C04B 40/00* | (2006.01) | |
| *C04B 103/00* | (2006.01) | |
| *C04B 111/21* | (2006.01) | |
| *C04B 111/80* | (2006.01) | |
| *C04B 111/00* | (2006.01) | |

(52) U.S. Cl.
CPC .......... *C04B 28/02* (2013.01); *C04B 24/2641* (2013.01); *C04B 28/04* (2013.01); *C04B 28/06* (2013.01); *C04B 28/08* (2013.01); *C04B 40/0042* (2013.01); *C04B 41/009* (2013.01); *C04B 41/5076* (2013.01); *C04B 41/5079* (2013.01); *C04B 41/65* (2013.01); *C09D 5/002* (2013.01); *C09D 5/03* (2013.01); *C09D 133/14* (2013.01); *C04B 2103/0065* (2013.01); *C04B 2111/00491* (2013.01); *C04B 2111/00508* (2013.01); *C04B 2111/21* (2013.01); *C04B 2111/802* (2013.01); *Y02W 30/94* (2015.05)

(58) Field of Classification Search
CPC ......... C04B 28/02; C04B 28/04; C04B 28/06; C04B 28/08; C04B 41/5076; C04B 41/009; C04B 41/5079; C04B 41/65; C04B 24/2641; C04B 40/0042; C04B 2103/0065; C04B 2111/00491; C04B 2111/00508; C04B 2111/21; C04B 2111/802; C09D 133/14; C09D 5/002; C09D 5/03; Y02W 30/94
See application file for complete search history.

(56) References Cited

U.S. PATENT DOCUMENTS

| | | |
|---|---|---|
| 6,090,868 A | 7/2000 | Eck et al. |
| 6,576,698 B1 | 6/2003 | Weitzel |
| 6,762,221 B1 | 7/2004 | Pakusch et al. |
| 2004/0198896 A1* | 10/2004 | Pakusch .................. C08J 3/122 524/556 |
| 2017/0008801 A1 | 1/2017 | Nieberle et al. |
| 2017/0283319 A1* | 10/2017 | Maslehuddin .......... C04B 28/04 |

FOREIGN PATENT DOCUMENTS

| | | |
|---|---|---|
| EP | 1 110 978 A1 | 6/2001 |
| EP | 2 881 409 A1 | 6/2015 |
| JP | 62-79875 A | 4/1987 |
| JP | 2-186048 A | 7/1990 |
| JP | 6-41381 A | 2/1994 |
| JP | 7-317094 A | 12/1995 |
| JP | 2005-343761 A | 12/2005 |
| JP | 2014-15386 A | 1/2014 |
| WO | WO 97/18175 A1 | 5/1997 |
| WO | WO 98/03577 A1 | 1/1998 |
| WO | WO 2015/110301 A1 | 7/2015 |

* cited by examiner

Primary Examiner — Robert S Jones
(74) Attorney, Agent, or Firm — Faegre Drinker Biddle & Reath LLP

(57) ABSTRACT

The present invention relates to primer compositions in powder form that comprise a dispersion powder based on an acrylate polymer having a glass transition temperature in the range from −50° C. to +30° C. and cement. The compositions of the invention are notable for good water barrier effect, good dust-binding capacity, and a low tendency toward salt efflorescence. The compositions find use in the priming of masonry, concrete, rendered surfaces, abraded render, plaster surfaces, wall blocks, wood, and ceramic tiles. They can also be used as adhesion promoters with nonabsorbent substrates such as glazed ceramic or glass tiles, metal surfaces, or surfaces of plastic.

15 Claims, No Drawings

PULVERULENT PRIMER COMPOSITION

The present invention relates to a primer composition in powder form, comprising a dispersion powder based on an acrylate polymer having a glass transition temperature Tg in the range from −50° C. to +30° C. and cement, and also to the use of the composition for the priming of surfaces.

Acrylate-based polymer dispersions find broad application—for example, as binders for synthetic-resin renders, interior paints, adhesives, or coating materials, or as primers which can be applied to mineral substrates of plaster, concrete, etc. The polymers may be provided in the form of an aqueous dispersion or in powder form.

WO 98/03577 describes a method for producing acrylate-based polymer powders by spray drying in the presence of a drying assistant. WO 98/03577 further describes the use of said powders as binders in hydraulically setting materials. The compositions described comprise a main fraction of mineral binder (20 to 60 wt %) and the polymer powder as additive (0.1 to at most 20 wt %, more particularly 0.1 to 10 wt %). Examples given of cement-based compositions of this kind include reinforcing mortars.

WO 97/18175 describes redispersible polymer powders, based in particular on ethylene-vinyl acetate copolymers or acrylate-based copolymers, which may be admixed to mineral binder compositions. Examples of these compositions are joint fillers, construction adhesives, or roller-applied render formulas, all of which are distinguished by a high fraction of cementitious components.

WO 2015/110301 describes binder compositions for use in flexible mineral waterproofing grouts. The compositions comprise a dispersion polymer having a glass transition temperature 20° C. which includes high amounts of ethyl acrylate, i.e. 35 wt % and 65 wt %. Compositions for waterproofing grouts are unsuitable as primers for absorbent or non-absorbent substrates.

Applications above are characterized by high cement and filler contents, of 25-60% and 40-75%, respectively. The polymer content is customarily between 0-10%.

For primers there are two dominant classes of formulation: a) unfilled primers, in which no fillers are employed. This kind of primer is used primarily with absorbent substrates such as, for example, cementitious surfaces, plasterboard, or wood. The function of the primer here is seen as that of a good water barrier effect. b) filled primers are employed usually on nonabsorbent substrates, such as on old glazed tiles or surfaces of plastic/metal, for example. The function of the primer here is seen as that of an adhesion promoter. The water barrier effect plays a minor part here. In both application scenarios, however, it is necessary to ensure good wet strength for the primer. For this reason, primers are nowadays produced from dispersions, and not in powder form. A reason for the poorer wet strength of the dispersion powders is the need to use drying assistants at the drying stage. These drying assistants are very water-sensitive and result in a reduction in the wet strength of a polymer film produced from a redispersed polymer powder. The emulsifiers used in the parent dispersion are another codeterminate of good or reduced wet strength. For example, colloid-stabilized dispersions on a polyvinyl alcohol basis (PVA) are usually more sensitive than emulsifier-stabilized dispersions.

JP 06041381 describes acrylate-based dispersion powders which have been modified with polyvinyl alcohol and the use thereof as a primer for cementitious systems or plaster, for example.

It is an object of the present invention, accordingly, to provide a primer composition having improved wet strength and/or water barrier effect.

This object is achieved by means of a primer composition in powder form, comprising a) a dispersion powder based on an acrylate polymer having a glass transition temperature Tg from −50° C. to +30° C. and b) cement, the weight ratio of dispersion powder to cement being in the range from 5:1 to 30:1.

The term "acrylate polymer" as used herein means a polymer comprising units of esters of $\alpha,\beta$-ethylenically unsaturated monocarboxylic acids or dicarboxylic acids, preferably $C_3$-$C_6$ monocarboxylic acids or $C_4$-$C_8$ dicarboxylic acids.

In one embodiment the acrylate polymer may be a straight acrylic polymer comprising units of at least one of the monomers (a1) (esters based on acrylic or methacrylic acid) specified below ("units" means herein the structural units of the monomers which are present in polymerized form).

In another embodiment, the monomers (a1) are selected from the esters of $\alpha,\beta$-ethylenically unsaturated $C_3$-$C_6$ monocarboxylic acids or $C_4$-$C_8$ dicarboxylic acids with $C_3$-$C_{12}$ alkanols, preferably $C_3$-$C_8$ alkanols. The ester monomers optionally comprise up to 30 wt %, preferably up to 20 wt % or up to 10 wt %, of the $C_1$-$C_2$ alkanol ester of said $\alpha,\beta$-ethylenically unsaturated $C_3$-$C_6$ monocarboxylic acids or $C_4$-$C_8$ dicarboxylic acids. In particular, the esters do not comprise a $C_1$-$C_2$ alkanol ester.

The esters of the $\alpha,\beta$-monoethylenically unsaturated $C_3$-$C_6$ monocarboxylic acids or $C_4$-$C_8$ dicarboxylic acids are, in particular, esters of acrylic acid, methacrylic acid, maleic acid, fumaric acid, or itaconic acid or mixtures thereof. Preferred are esters of acrylic acid, methacrylic acid, or maleic acid or mixtures thereof, in particular esters of acrylic acid or methacrylic acid or mixtures thereof. Examples of such esters are methyl (meth)acrylate, ethyl (meth)acrylate, n-butyl (meth)acrylate, isobutyl (meth)acrylate, tert-butyl (meth)acrylate, n-hexyl (meth)acrylate, 2-ethylhexyl (meth)acrylate, decyl (meth)acrylate, or dodecyl (meth)acrylate, dimethyl maleate, di-n-butyl maleate, or di-n-butyl fumarate or mixtures thereof. Preferred esters are n-butyl acrylate, 2-ethylhexyl acrylate, or mixtures thereof.

In another embodiment, the polymer comprises in addition to the units of monomers (a1) units of at least one other monomer, copolymerizable with the monomer (a1) which are selected from vinylaromatic compounds and vinyl or allyl esters of $C_1$-$C_{12}$ carboxylic acids and preferably from vinylaromatic compounds.

Examples of vinylaromatic compounds are styrene, carboxylated or sulfonated styrene, $\alpha$-methylstyrene, or vinyltoluenes, such as o-vinyltoluene, or mixtures thereof.

Vinyl and allyl esters which can be used are vinyl acetate, vinyl propionate, vinyl n-butyrate, vinyl laurate, or vinyl stearate, or mixtures thereof and also allyl acetate, allyl propionate, allyl n-butyrate, allyl laurate, or allyl stearate or mixtures thereof.

Preferred monomers (a2) are styrene, ethyl vinyl ether, vinyl acetate, or vinyl propionate or mixtures thereof. Styrene is the most preferred monomer (a2).

In another embodiment, the polymer comprises in addition to the units of monomers (a1) and optionally (a2) units of at least one further monomer (a3), copolymerizable with the monomers (a1) and (a2) which is selected from $\alpha,\beta$-ethylenically unsaturated $C_3$-$C_6$ monocarboxylic acids or $C_4$-$C_8$ dicarboxylic acids, (meth)acrylamide, N,N-monoand di-$C_1$-$C_4$-alkyl(meth)acrylamides, (meth)acrylonitrile, N-vinyl derivatives of cyclic lactams, hydroxy-$C_2$-$C_4$-alkyl (meth)-acrylates, and N,N-mono- and di-$C_1$-$C_4$-alkylaminoalkyl (meth)acrylates.

Preferred monomers (a3) are acrylamide, methacrylamide, acrylic acid, methacrylic acid, acrylonitrile, methacrylonitrile, 2-acrylamido-2-methylpropanesulfonic acid, vinylpyrrolidone, hydroxyethyl acrylate, hydroxyethyl methacrylate, hydroxypropyl acrylate, or hydroxypropyl methacrylate. Especially preferable are (meth)acrylic acid, (meth)acrylamide, (meth)acrylonitrile, hydroxyethyl (meth) acrylate, and hydroxypropyl (meth)acrylate.

In another embodiment, the polymer comprises in addition to the units of monomers (a1) and optionally (a2) and optionally (a3) units of at least one further monomer (a4), copolymerizable with the monomers (a1), (a2), and (a3) which is selected from compounds which comprise at least two nonconjugated, ethylenic double bonds. Preferred monomers (a4) are the diesters of dihydroxy compounds with α,β-ethylenically unsaturated $C_3$-$C_6$ monocarboxylic acids, such as ethylene glycol di(meth)acrylate, propylene glycol di(meth)acrylate, 1,3-butylene and 1,4-butylene glycol di(meth)acrylate, glycidyl (meth)acrylate, 2,2-dimethylpropylene glycol di(meth)acrylate, the vinyl and allyl esters of $C_4$-$C_8$ dicarboxylic acids, such as divinyl and diallyl maleate, divinyl and diallyl fumarate, divinyl and diallyl phthalate, and also divinylbenzene, cyclopentadienyl acrylate and methacrylate, cyclohexenyl acrylate and methacrylate, tricyclodecenyl acrylate and methacrylate, N,N'-divinylimidazolin-2-one, butadiene, and triallyl cyanurate.

In another embodiment the polymer is a styrene acrylate which is defined herein as a copolymer comprising units of styrene and of an ester of acrylic or methacrylic acid with a $C_3$-$C_{12}$ alkanol, preferably a $C_3$-$C_8$ alkanol, and optionally units of monomers (a3) and/or monomers (a4).

In an embodiment, the styrene acrylate comprises
(a1) units of esters of acrylic acid or methacrylic acid or a mixture thereof with a $C_3$-$C_{12}$ alkanol, preferably a $C_3$-$C_8$ alkanol, or a mixture thereof,
(a2) units of styrene,
(a3) units of acrylamide or methacrylamide or a mixture thereof,
(a4) optionally units of a crosslinking monomer (a4).
In another embodiment the polymer comprises units of
30 to 85 wt %, preferably 35 to 80 wt %, of the monomer (a1),
15 to 70 wt %, preferably 20 to 75 wt %, of the monomer (a2),
0 to 15 wt %, preferably 0.5 to 10 wt %, of the monomer (a3), and
0 to 10 wt %, preferably 0.1 to 5 wt %, of the monomer (a4),
based in each case on the total monomer amount.
In another embodiment the polymer comprises units of
50 to 85 wt % of the monomer (a1).
In another embodiment the polymer comprises units of
50 to 85 wt % of the monomer (a1) and
15 to 50 wt % of the monomer (a2).
In another embodiment the polymer comprises units of
50 to 80 wt %, preferably 60 to 80 wt %, of the monomer (a1),
15 to 40 wt %, preferably 15 to 30 wt %, of the monomer (a2),
0.5 to 15 wt %, preferably 0.5 to 10 wt %, of the monomer (a3), and
0 to 10 wt %, preferably 0 to 5 wt %, of the monomer (a4), based in each case on the total monomer amount.

If units of monomer (a4) are present, then they are present in an amount of 0.1 to 10 wt %, preferably 0.1 to 5 wt %, based on the total monomer amount.

The expressions $C_n$-$C_m$ here relate to the number of carbons possible in accordance with the invention in a particular class of compound. Alkyl groups may be linear or branched.

The preparation of the polymer is known. It is accomplished generally by radical emulsion polymerization, conducted preferably in polar solvents, especially in water. For adjusting the molecular weight it is possible to make accompanying use of substances which regulate molecular weight, known as chain transfer agents. Examples of suitable such agents are compounds which have a thiol group and/or a silane group (e.g., tert-dodecyl or n-dodecyl mercaptan or mercaptopropyltrimethoxy-silane), allyl alcohols, or aldehydes, such as formaldehyde, acetaldehyde, etc.

Examples of suitable initiators are inorganic peroxides, such as sodium peroxodisulfate or azo compounds.

In general a protective colloid is used, such as polyvinylpyrrolidone or cellulose derivatives, or anionic and/or nonionic emulsifiers, such as ethoxylated mono-, di-, or trialkylphenols, ethoxylated fatty alcohols, and alkali metal salts or ammonium salts of $C_8$-$C_{12}$ alkyl sulfates, sulfuric monoesters of ethoxylated $C_{12}$-$C_{18}$ alkanols, $C_{12}$-$C_{18}$ alkylsulfonic acids, $C_9$-$C_{18}$ alkylarylsulfonic acids, and sulfonated alkyl diphenyl ethers. The polymerization temperature is generally in the range from 50 to 120° C., more particularly 70 to 100° C.

After the polymerization, the polymer is generally in the form of a dispersion, more particularly an aqueous dispersion.

Drying the polymer to form the dispersion powder can be accomplished in a usual way, by means, for example, of freeze drying or, preferably, spray drying. In the case of spray drying, the approach taken is for the entry temperature of the stream of hot air to be in the range from 100 to 200° C., preferably 120 to 160° C., and the exit temperature of the stream of hot air to be in the range from 30 to 90° C., preferably 60 to 80° C. The spraying of the polymer in the stream of hot air may take place, for example, by means of single-fluid or multifluid nozzles or via a rotating disk. The polymer powders are normally deposited using cyclones or filter separators. The sprayed polymer dispersion and the stream of hot air are preferably guided in parallel.

Examples of drying assistants which can be added to the polymer that is to be dried, prior to its drying are naphthalenesulfonic acid-formaldehyde condensates, phenolsulfonic acid-formaldehyde condensates, benzenesulfonic acid-formaldehyde condensates, polyvinyl alcohol, polyvinylpyrrolidone, or homopolymers or copolymers of 2-acrylamido-2-methylpropanesulfonic acid. The drying assistants may be added as a solid or as an aqueous solution. Based on the total mass of polymer and drying assistant, the drying assistant may be used, for example, in an amount of 0.1 to 15 wt %, preferably 5 to 12 wt %, based on dry solids.

The polymer to be dried may also, moreover, have flow aids and antiblocking agents added to it. Suitable flow aids and antiblocking agents are, for example, silica or talc. The flow aid is added generally in an amount of 0.1 to 15 wt %, based on the total mass of polymer, flow aid, and antiblocking agent. The antiblocking agent is generally added in an amount of 0-20 wt %, based on the total mass of polymer, flow aid and antiblocking agent.

The polymer generally has a glass transition temperature Tg of −50° C. to +30° C. The glass transition temperature of the polymer is preferably −30° C. to +15° C., more particularly −20° C. to +5° C.

The glass transition temperature may be estimated in accordance for example with the method of Fox (T. G. Fox, Bull. Am. Phys. Soc. (Ser. II) 1, 123 [1956] or Ullmanns Encyklopädie der technischen Chemie, Weinheim (1980), pp. 17, 18). Accordingly, the glass transition temperature of copolymers is given at high molar masses in good approximation by $$\frac{1}{T_g} = \frac{X^1}{T_g^1} + \frac{X^2}{T_g^2} + \dots \frac{X^n}{T_g^n}$$

where $X^1, X^2, \dots, X^n$ are the mass fractions $1, 2, \dots, n$ and $T_g^1, T_g^2, \dots, T_g^n$ are the glass transition temperatures of the polymers synthesized in each case only from one of the monomers $1, 2, \dots, n$, in degrees Kelvin. The latter are known from, for example, Ullmann's Encyclopedia of Industrial Chemistry, VCH, Weinheim, Vol. A 21 (1992) p. 169 or from J. Brandrup, E. H. Immergut, Polymer Handbook 3rd edn., J. Wiley, New York 1989.

The glass transition temperature of copolymers can also be determined experimentally. Suitable measurement techniques are dynamic mechanical analysis (DMA), dynamic scanning calorimetry (DSC), which captures the heat capacity $C_p$ as a function of the temperature, dielectric relaxation spectroscopy, and dilatometry. The glass transition temperature of copolymers is suitably determined by means of DSC measurements, using a Q20 or Q2000 from TA Instruments, for example.

In addition to the dispersion powder, the composition of the invention also comprises cement.

In one embodiment the cement is selected from blast furnace cement, oil shale cement, Portland cement, white cement, hydrophobized Portland cement, rapid-setting cement, high-expansion cement, and also CAC (calcium aluminate cement), HAC (high-alumina cement), or CSA (calcium sulfoaluminate cement).

In one preferred embodiment the cement in the composition of the invention has an $Fe_2O_3$ content of less than 5 wt %, based on the total mass of the cement.

In another preferred embodiment the cement is selected from white cements. White cement belongs to the group of the Portland cements and has a low iron oxide content. White cement is available commercially under, for example, the trade names Dyckerhoff Weiß CEM I 52,5 R from Dyckerhoff GmbH of Wiesbaden and Ternal White from Kerneos of Paris.

The cement, more particularly white cement, as a constituent of the composition of the invention is capable of binding auxiliaries which are used in the production of the dispersion powder (drying assistants, antiblocking agents) on its surface and hence of acting as an absorbent.

The weight ratio of the dispersion powder to cement in the composition of the invention is 5:1 to 30:1.

In one embodiment of the composition of the invention the weight ratio of dispersion powder to cement is in a range from 5:1 to 21:1, preferably 7:1 to 15:1.

The composition of the invention may comprise additional customary auxiliaries, examples being defoamers, thickeners, fillers, and natural or synthetic fibers. Auxiliaries also encompass the aforementioned drying assistants, flow aids, and antiblocking agents. The auxiliaries may be included, for example, in an amount of 0 to 5 wt %, preferably 0.5 to 3 wt %, based on the total mass of the composition, in the composition.

In one embodiment the composition of the invention comprises
a) 87.5-93.75 wt % of the dispersion powder which is preferably based on a styrene acrylate,
b) 6.25-12.5 wt % of cement, and
c) 0-6.25 wt % of auxiliaries,
based in each case on the total mass of the composition, with the dispersion powder and the cement being as defined above.

In another embodiment the composition of the invention comprises
a) 87.5-93.75 wt % of the dispersion powder which is preferably based on a styrene acrylate,
b) 6.25-12.5 wt % of white cement, and
c) 0-6.25 wt % of auxiliaries,
based in each case on the total mass of the composition, with the dispersion powder and the white cement being as defined above.

For use the composition of the invention is redispersed in water and applied to the substrate to be treated in a conventional manner.

The wet strength and water barrier effect relative to a redispersed composition of a pure polymer powder without cement fraction are significantly improved. Surprisingly it has been found that just a small amount of cement is sufficient for this purpose, and so the formation of a film by the redispersed composition is significantly improved. The use of white cement in particular exhibits the best absorption effects in this respect.

This means that it is possible to inhibit the penetration of water into substrates (concrete, plaster, etc.) treated with the composition of the invention. Moreover, substrates treated with compositions of the invention exhibit a low tendency toward efflorescence (emergence of, for example, Ca or Cl ions), and a high dust-binding capacity. High dust-binding capacity facilitates the further working of the substrates pretreated with the primer, as in the case of the application of paint to a primed wall, for example.

The invention further relates to the use of the primer composition in powder form for priming absorbent substrates of masonry, concrete, rendered surfaces, abraded render, plaster surfaces, wall blocks, wood, and ceramic tiles.

The invention also relates to the use of the primer compositions in powder form as adhesion promoters for nonabsorbent substrates, such as glazed ceramic or glass tiles, metal surfaces, or surfaces of plastic.

The examples which follow illustrate the invention without limiting it.

The primer compositions in powder form were obtained by mixing the dispersion powder with a cement component, a thickener, and a defoamer. Water was added to give aqueous dispersions (redispersed compositions).

The compositions reported in Table 1 were obtained:
Sample 0=reference without primer;
Sample 1=conventional primer based on an aqueous dispersion;
Sample 2=primer based on a redispersed BASF polymer powder type Acronal S 430P (copolymer on the basis of 70-75 wt % of butylacrylate, 23-26 wt % of styrene, 1-4 wt % of acrylamide, 1-3 wt % of methacrylamide; 9-12 wt % naphthalene sulfonic acid-formaldehyde condensate; $T_g$-15° C.);

Sample 3=primer based on a redispersed BASF polymer powder type Acronal S 430P in conjunction with white cement (invention);

Sample 4=primer based on a redispersed EVA polymer powder in conjunction with white cement.

Tests 1 to 3 below were carried out in order to evaluate the compositions:

1. Water Barrier Effect

The compositions for testing (samples 0 to 5) were applied in an amount of 150 g/m² (2.25 g), using a brush, to a plasterboard panel (PBP) (area 15×10 cm). After one day's drying time under standard conditions (23° C./50% rh), two Karsten tubes (available commercially) were adhered. A Karsten tube is a calibrated glass test tube with a bell-like extension at the lower end having a diameter of 30 mm and with a volumetric cylinder with a capacity of 10 ml mounted thereon. The test tube is provided with marking in 0.5 ml steps from 0-5 ml. The measurement scale runs from top to bottom on the glass tube. A silicone sealant was used for bonding to the test specimen and for sealing to prevent emergence of water from the test tube. The test tube was filled up to the 0 ml mark with water. At the top of the volumetric cylinder, the Karsten tube was sealed with Parafilm® and the loss of water from the tube in ml into the test composition was ascertained after 1, 4, 5, 6, and 7 days. The lower the loss of water from the tube, the better the barrier effect provided by the primer composition.

2. Efflorescence

A lime sand block (160×40×20 mm) was sealed in the middle over a width of about 2 cm with Styrofan D 422 (styrene-butadiene copolymer, BASF SE). One half of the test body was coated with the primer (samples 0-4) and dried. After 24 hours' drying, the untreated side was placed in 250 ml of a 3% strength $KNO_3$ solution. After 7 days' storage in the salt solution, examination was made for crystal formation on the test body (primer application rate: 150 g/m², test area about 92 cm²). The water/salt ratio was used for assessing the barrier effect of the primer composition. The higher said ratio, the better the barrier effect against the emergence of ions (e.g., $Cl^-$, $Ca^{2+}$) from the test body.

3. Dust-Binding Capacity

One side of a concrete test body (150×50×15 mm) was coated completely with the primer (samples 0-4). After 24 hours' drying, the test body was placed with its coated side downward into a trough filled with 200 g of silica sand (0-0.09 mm grain size). After a residence time of 1 minute, the test body was removed and then struck gently three times vertically. The test body was weighed before and after being struck (application rate: 150 g/m²; test area about 75 cm²). A high dust-binding capacity is advantageous for the further working of the primer. The higher the dust-binding ability of the primer, for example, the better the adhesion of paint when a primer was applied.

4. Tensile Adhesion Test (Bond Strength)

One side of a concrete test body (300×400×50 mm) was coated completely with the primer (samples 0-4; primer application rate: 150 g/m²; applied with a brush) After drying for 24 h the coated test body was covered with a cement based self leveling underlayment (SLU Periplan of PCI Augsburg GmbH, Germany). After drying of 7 days 4 metal anchors for each sample were glued on the SLU (glue: e.g. 3m Scotch-Weld 2c adhesion glue DP-100). After hardening (2 h) bond strength was measured by Herion HP1000 equipment (strength increase during the test was 250 N/s). The average adhesion value of 4 single results for each sample was calculated and noted in Table 1.

Further, the failure pattern after the test was noted in Table 1:

Adh-Sub: Adhesion failure between substrate and primer
Coh. SB: Cohesion failure in the tile adhesive Cohesion failure tile adhesive means that the primer has a higher adhesion to the substrate as the internal strength of the tile adhesive. So the adhesion strength of the primer in samples 1, 3 and 4 is higher than the value in table 1.

The results of the tests are given, together with the compositions of samples 0 to 5, in the table below.

TABLE 1

|  |  | 0 | 1 (invention) | 2 | 3 (invention) | 4 | 5 (invention) |
|---|---|---|---|---|---|---|---|
| No primer |  | x |  |  |  |  |  |
| Primer based on AN S 533 (dispersion) |  |  | x |  |  |  |  |
| EVA powder |  |  |  |  |  | 18.3 |  |
| AN S 430 P |  |  |  | 18.3 | 18.3 |  | 18.3 |
| Powder defoamer |  |  |  | 0.20 | 0.20 | 0.20 | 0.20 |
| Powder thickener |  |  |  | 0.15 | 0.15 | 0.15 | 0.15 |
| White cement CEM I52.5 R |  |  |  |  | 1.83 | 1.83 | 3.66 |
| Finely ground limestone, 5 μm |  |  |  | 1.83 |  |  |  |
| Water |  |  |  | 81.3 | 81.3 | 81.3 | 81.3 |
|  | Total: |  |  | 101.78 | 101.78 | 101.78 | 103.61 |
| Water barrier effect on PBP: | (appl.: 150 g/m²) |  |  |  |  |  |  |
| After 1 day | ml | 0.7 | 0.3 | 0.6 | 0.4 | 0.5 | 0.3 |
| After 4 days | ml | 2.3 | 1.2 | 2 | 1.2 | 1.7 | 1.1 |
| After 5 days | ml | 2.9 | 1.3 | 2.5 | 1.4 | 2.2 | 1.4 |
| After 6 days | ml | 3.5 | 1.4 | 3.5 | 1.7 | 2.5 | 1.6 |
| After 7 days | ml | >4 | 1.5 | >4 | 1.9 | 2.9 | 1.8 |
| Tensile adhesion test: | (appl.: 150 g/m²) |  |  |  |  |  |  |
| On concrete after 7 days with PCI Periplan | N/mm² | 0.6 | 1.5 | 0.8 | 1.3 | 1.2 |  |
|  | Fracture mode | Adh-Sub | Coh.SB | Adh-Sub | Coh.SB | Coh.SB |  |
| Efflorescence, primer: | (appl.: 150 g/m²) | in g | in g | in g | in g | in g |  |

TABLE 1-continued

|  |  | 0 | 1 (invention) | 2 | 3 (invention) | 4 | 5 (invention) |
|---|---|---|---|---|---|---|---|
| Lime sandstone with dispersion |  | 248.9 | 248.5 | 249.2 | 250.9 | 246.9 |  |
| Lime sandstone | after 7 days | 272.7 | 272.9 | 272.7 | 257.2 | 273.1 |  |
| without salt | after 14 days | 276.9 | 274.4 | 276.9 | 276.4 | 273.7 |  |
| Remaining water quantity, beaker | after 7 days | 172.6 | 175.3 | 172.6 | 157.3 | 159.3 |  |
| (3% KNO3 solution) | after 14 days | 156.4 | 135.8 | 156.4 | 85.1 | 100.3 |  |
| Remaining water quantity total | after 7 days | 196.4 | 199.7 | 196.2 | 163.6 | 185.5 |  |
| (3% KNO3 solution) | after 14 days | 184.5 | 161.7 | 184.2 | 110.6 | 127.1 |  |
| Efflorescence: | after 7 days | 0.19 | 0.02 | 0.19 | 0.03 | 0.07 |  |
|  | after 14 days | 0.25 | 0.04 | 0.25 | 0.45 | 0.82 |  |
| Water/salt ratio: | after 7 days | 282 | 2515 | 283 | 2880 | 921 |  |
|  | after 14 days | 262 | 2207 | 263 | 310 | 150 |  |
| Dust-binding capacity, primer | (appl.: 150 g/m$^2$) | in g | in g | In g | in g | in g |  |
| Concrete test body with dispersion |  | 258.08 | 248.16 | 258.60 | 267.33 | 247.74 |  |
| Concrete test body in silica sand (0-0.09 mm) | after 1 min storage | 258.20 | 248.40 | 258.80 | 267.57 | 247.88 |  |
| Difference |  | 0.12 | 0.24 | 0.2 | 0.24 | 0.14 |  |
| Dust-binding capacity per g/m$^2$ |  | 16 | 32 | 27 | 32 | 19 |  |

In comparison with the comparative example without cement (sample 2) and with sample 4 (redispersed EVA powder composition), the inventive sample 3 exhibits a better water barrier effect, lower efflorescence, and high dust-binding capacity. Relative to a conventional aqueous dispersion (sample 1), the results are in the region of a conventional aqueous dispersion (sample 1). The composition of the invention is therefore significantly better for primers, especially as a function of the water barrier effect.

EMBODIMENTS OF THE INVENTION

1. A primer composition in powder form, comprising
   a) a dispersion powder based on an acrylate polymer having a glass transition temperature Tg from −50° C. to +30° C. and
   b) cement,
   the weight ratio of dispersion powder to cement being in the range from 5:1 to 30:1.

2. The composition of embodiment 1, wherein the weight ratio of dispersion powder to cement is in the range from 5:1 to 21:1.

3. The composition of embodiment 2, wherein the weight ratio of dispersion powder to cement is in the range from 7:1 to 15:1.

4. The composition of any one of the preceding embodiments, wherein the polymer comprises monomer units of
   a1) at least one monomer selected from the esters of α,β-ethylenically unsaturated $C_3$-$C_6$ monocarboxylic acids or $C_4$-$C_8$ dicarboxylic acids with $C_3$-$C_{12}$ alkanols.

5. The composition of embodiment 4, wherein the monomer is selected from esters of acrylic acid, methacrylic acid, maleic acid, fumaric acid, or itaconic acid.

6. The composition of embodiment 5, wherein the monomer is selected from esters of acrylic acid, methacrylic acid and mixtures thereof.

7. The composition of embodiment 4 or 5, wherein the monomer is selected from propyl (meth)acrylate, n-butyl (meth)acrylate, isobutyl (meth)acrylate, tert-butyl (meth)acrylate, n-hexyl (meth)acrylate, 2-ethylhexyl (meth)acrylate, decyl (meth)acrylate, or dodecyl (meth)acrylate, dimethyl maleate, di-n-butyl maleate, and di-n-butyl fumarate.

8. The composition of embodiment 7, wherein the monomer is selected from n-butyl acrylate, 2-ethylhexyl acrylate, and mixtures thereof.

9. The composition of any one of embodiments 4 to 8, wherein the ester monomer optionally comprises up to 30 wt % of $C_1$-$C_2$ alkanol ester.

10. The composition of embodiment 9, wherein the ester monomer optionally comprises up to 20 wt % of $C_1$-$C_2$ alkanol ester.

11. The composition of embodiment 10, wherein the ester monomer optionally comprises up to 10 wt % of $C_1$-$C_2$ alkanol ester.

12. The composition of embodiment 4 to 8, wherein the ester monomer does not comprise a $C_1$-$C_2$ alkanol ester.

13. The composition of any one of the preceding embodiments, wherein the polymer additionally comprises units of
   a2) at least one other monomer, copolymerizable with the monomer (a1) and selected from vinylaromatic compounds and vinyl or allyl esters of $C_1$-$C_{12}$ carboxylic acids.

14. The composition of embodiment 13, wherein the monomer is selected from vinylaromatic compounds.

15. The composition of embodiment 13 or 14, wherein the monomer is selected from styrene, carboxylated styrene, sulfonated styrene, α-methylstyrene, or vinyltoluenes, such as o-vinyltoluene.

16. The composition of embodiment 13, wherein the monomer is selected from vinyl and allyl esters.

17. The composition of embodiment 16, wherein the monomer is selected from vinyl acetate, vinyl propionate, vinyl n-butyrate, vinyl laurate, and vinyl stearate, and also allyl acetate, allyl propionate, allyl n-butyrate, allyl laurate, and allyl stearate.

18. The composition of any one of the preceding embodiments, wherein the polymer additionally comprises units of
   a3) at least one other monomer, copolymerizable with the monomer (a1) and (a2) selected from α,β-ethylenically unsaturated $C_3$-$C_6$ monocarboxylic acids or $C_4$-$C_8$ dicarboxylic acids, (meth)acrylamide, N,N-mono- and di-$C_1$-$C_4$-alkyl(meth)acrylamides, (meth)acrylonitrile, N-vinyl derivatives of cyclic lactams, hydroxy-$C_2$-$C_4$-alkyl (meth)acrylates, and N,N-mono- and di-$C_1$-$C_4$-alkylaminoalkyl (meth)acrylates.

19. The composition of embodiment 18, wherein the monomer (a3) is selected from acrylamide, methacrylamide, acrylic acid, methacrylic acid, acrylonitrile, methacrylonitrile, 2-acrylamido-2-methylpropanesulfonic acid, vinylpyrrolidone, hydroxyethyl acrylate, hydroxyethyl methacrylate, hydroxypropyl acrylate, or hydroxypropyl methacrylate.

20. The composition of embodiment 19, wherein the monomer (a3) is selected from (meth)acrylic acid, (meth)acrylamide, (meth)acrylonitrile, hydroxyethyl (meth)acrylate, and hydroxypropyl (meth)acrylate.

21. The composition of any one of the preceding embodiments, wherein the polymer additionally comprises units of
(a4) at least one further monomer, copolymerizable with the monomers (a1), (a2), and (a3), which is selected from compounds which comprise at least two nonconjugated, ethylenic double bonds.

22. The composition of embodiment 21, wherein the monomer (a4) is selected from the diesters of dihydroxy compounds with $\alpha,\beta$-ethylenically unsaturated $C_3$-$C_6$ monocarboxylic acids, the vinyl and allyl esters of $C_4$-$C_8$ dicarboxylic acids, divinylbenzene, cyclopentadienyl acrylate and methacrylate, cyclohexenyl acrylate and methacrylate, tricyclodecenyl acrylate and methacrylate, N,N'-divinylimidazolin-2-one, butadiene, and triallyl cyanurate.

23. The composition of embodiment 21, wherein the monomer (a4) is selected from ethylene glycol di(meth)acrylate, propylene glycol di(meth)acrylate, 1,3-butylene and 1,4-butylene glycol di(meth)acrylate, glycidyl (meth)acrylate, 2,2-dimethylpropylene glycol di(meth)acrylate, divinyl maleate, diallyl maleate, divinyl fumarate, diallyl fumarate, divinyl phthalate, diallyl phthalate, and divinylbenzene.

24. The composition of any one of the preceding embodiments, wherein the polymer comprises
(a1) units of esters of acrylic acid or methacrylic acid or a mixture thereof with a $C_3$-$C_{12}$ alkanol, preferably a $C_3$-$C_8$ alkanol, or a mixture thereof,
(a2) units of styrene,
(a3) units of acrylamide or methacrylamide or a mixture thereof,
(a4) optionally units of a crosslinking monomer (a4).

25. The composition of any one of the preceding embodiments, wherein the polymer comprises units of 50 to 85 wt % of the monomer (a1), based in each case on the total monomer amount.

26. The composition of any one of the preceding embodiments, wherein the polymer comprises units of 15 to 50 wt % of the monomer (a2), based in each case on the total monomer amount.

27. The composition of any one of the preceding embodiments, wherein the polymer comprises units of 0.5 to 15 wt % of the monomer (a3), based in each case on the total monomer amount.

28. The composition of any one of the preceding embodiments, wherein the polymer comprises units of 0.1 to 10 wt % of the monomer (a4), based in each case on the total monomer amount.

29. The composition of any one of the preceding embodiments, wherein the polymer comprises units of
50 to 80 wt % of the monomer (a1),
15 to 40 wt % of the monomer (a2),
0.5 to 15 wt % of the monomer (a3), and
0 to 10 wt % of the monomer (a4),
based in each case on the total monomer amount.

30. The composition of any one of the preceding embodiments, wherein the polymer comprises units of
60 to 80 wt % of the monomer (a1),
15 to 30 wt % of the monomer (a2),
0.5 to 10 wt % of the monomer (a3), and
0 to 5 wt % of the monomer (a4),
based in each case on the total monomer amount.

31. The composition of embodiment 21, wherein the polymer comprises units of 60 to 80 wt % of the monomer (a1), selected from n-butyl acrylate, 2-ethylhexyl acrylate and mixtures thereof,
15 to 30 wt % of the monomer (a2) selected from styrene and vinyl acetate,
0.5 to 10 wt % of the monomer (a3) selected from acryl amide, methacryl amide, acrylic acid, methacrylic acid and mixtures thereof, and
0 to 5 wt % of the monomer (a4),
based in each case on the total monomer amount.

32. The composition of any one of the preceding embodiments, wherein the polymer has a glass transition temperature Tg of $-30°$ C. to $+15°$ C.

33. The composition of embodiment 32, wherein the polymer has a glass transition temperature Tg of $-20°$ C. to $+5°$ C.

34. The composition of any one of the preceding embodiments, wherein the cement is selected from blast furnace cement, oil shale cement, Portland cement, white cement, hydrophobized Portland cement, rapid-setting cement, high-expansion cement, high-alumina cement, and mixtures thereof.

35. The composition of embodiment 34, wherein the cement has an $Fe_2O_3$ content of less than 5 wt %, based on the total mass of the cement.

36. The composition of embodiment 34 or 35, wherein the cement is white cement.

37. The composition of any one of the preceding embodiments obtainable by preparing an aqueous dispersion of the polymer, subjecting the polymer dispersion to drying and admixing the dried polymer powder with cement.

38. The composition of any one of the preceding embodiments in the form of an aqueous dispersion.

39. The composition of embodiment 38, obtainable by redispersing the composition of any one of embodiments 1 to 32.

40. The composition of any one of the preceding embodiments, further comprising auxiliaries such as defoamers, thickeners, fillers, natural or synthetic fibers, drying assistants, or antiblocking agents.

41. The composition of embodiment 40, comprising as drying assistant a polymer or oligomer comprising a functional group selected from sulfonic acid and carboxylic acid group and the salts thereof.

42. The composition of embodiment 40, wherein the polymer or oligomer is a condensate of formaldehyde with naphthalene sulfonic acid, melamine sulfonic acid, phenol sulfonic acid, lignin sulfonic acid, homo or copolymers of 2-acrylamido-2-methylpropane sulfonic acid and the salts thereof.

43. The composition of embodiment 41 or 42 comprising 1 to 40 wt % of the polymer or oligomer, based on the total weight of the polymer.

44. The use of the composition of any of the preceding embodiments for priming absorbent substrates, such as masonry, concrete, rendered surfaces, abraded render, plaster surfaces, wall blocks, wood, and ceramic tiles.

45. The use of the composition of any of embodiments 1 to 43 as an adhesion promoter with nonabsorbent substrates, such as glazed ceramic or glass tiles, metal surfaces, or surfaces of plastic.

The invention claimed is:
1. A primer composition in powder form, comprising
a) 87.5 to 93.75 wt % of a dispersion powder based on a polymer having a glass transition temperature Tg of from $-50°$ C. to $+30°$ C., comprising:

monomer units derived from a first monomer, which is at least one selected from the group consisting of an ester of an α,β-ethylenically unsaturated $C_3$-$C_6$ monocarboxylic acid or $C_4$-$C_8$ dicarboxylic acid with a $C_3$-$C_{12}$ alkanol, wherein the first monomer optionally comprises up to 30 wt % of a $C_1$-$C_2$ alkanol ester, and units derived from a second monomer, copolymerizable with the first monomer, wherein the second monomer is a vinylaromatic compound, and b) 6.25 to 12.5 wt % of cement, wherein a weight ratio of the dispersion powder to the cement is of from 7:1 to 15:1.

2. The primer composition according to claim 1, wherein the polymer additionally comprises units derived from a third monomer, copolymerizable with the first and second monomers, and wherein the third monomer is at least one selected from the group consisting of an α,β-ethylenically unsaturated $C_3$-$C_6$ monocarboxylic acid or $C_4$-$C_8$ dicarboxylic acid, (meth)acrylamide, a N,N-mono-di-$C_1$-$C_4$-alkyl (meth)acrylamide, (meth)acrylonitrile, a N-vinyl derivative of a cyclic lactam, a hydroxy-$C_2$-$C_4$-alkyl (meth)-acrylate, and a N,N-mono- or di-$C_1$-$C_4$-alkylaminoalkyl(meth)acrylate.

3. The primer composition according to claim 1, wherein the polymer additionally comprises units derived from fourth monomer, copolymerizable with the first, second and third monomers, and wherein the fourth monomer is a compound comprising at least two nonconjugated, ethylenic double bonds.

4. The primer composition according to claim 1, wherein the first monomer is at least one selected from the group consisting of n-propyl acrylate, methyl ethyl acrylate, n-butyl acrylate, n-hexyl acrylate, 2-ethylhexyl acrylate, n-hexyl methacrylate, and 2-ethylhexyl methacrylate.

5. The primer composition according to claim 2, wherein the third monomer is at least one selected from the group consisting of acrylamide, methacrylamide, acrylic acid, methacrylic acid, acrylonitrile, methacrylonitrile, 2-acrylamido-2-methylpropanesulfonic acid, vinylpyrrolidone, hydroxyethyl acrylate, hydroxyethyl methacrylate, hydroxypropyl acrylate, and hydroxypropyl methacrylate.

6. The primer composition according to claim 3, wherein the fourth monomer is selected from the group consisting of butadiene, ethylene glycol di(meth)acrylate, propylene glycol di(meth)acrylate, 1,3-butylene and 1,4-butylene glycol di(meth)acrylate, 2,2-dimethylpropylene glycol di(meth)acrylate, divinyl maleate, diallyl maleate, divinyl fumarate, diallyl fumarate, divinyl phthalate, diallyl phthalate, divinylbenzene, cyclopentadienyl acrylate, cyclopentadienyl methacrylate, cyclohexenyl acrylate and cyclohexenyl methacrylate, tricyclodecenyl acrylate and tricyclodecenyl methacrylate, N,N'-divinylimidazolin-2-one, and triallyl cyanurate.

7. The primer composition according to claim 1, wherein the polymer comprises units derived from 50 to 85 wt % of the first monomer.

8. The primer composition according to claim 1, wherein the cement is at least one selected from the group consisting of blast furnace cement, oil shale cement, Portland cement, white cement, hydrophobized Portland cement, rapid-setting cement, high-expansion cement and high-alumina cement.

9. The primer composition according to claim 8, wherein the cement has an $Fe_2O_3$ content of less than 5 wt %, based on a total mass of the cement.

10. The primer composition according to claim 9, wherein the cement is a white cement.

11. The primer composition according to claim 1, wherein the polymer has a glass transition temperature Tg of −30° C. to +15° C.

12. The primer composition according to claim 1, further comprising:

an auxiliary.

13. The primer composition according to claim 9, comprising a polymer or oligomer comprising a functional group selected from the group consisting of a sulfonic acid group, a carboxylic acid group and salts thereof.

14. A method for priming an absorbent substrate, the method comprising:

priming the absorbent substrate with the primer composition according to claim 1.

15. An adhesion promoter for promoting adhesion with at least one nonabsorbent substrate, wherein the adhesion promotor comprises the primer composition according to claim 1.

* * * * *